US010053182B2

(12) United States Patent
Kobayashi

(10) Patent No.: US 10,053,182 B2
(45) Date of Patent: Aug. 21, 2018

(54) HYDRAULIC PRESSURE MASTER CYLINDER FOR BAR-HANDLE VEHICLE

(71) Applicant: NISSIN KOGYO CO., LTD., Ueda, Nagano (JP)

(72) Inventor: Naoki Kobayashi, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 200 days.

(21) Appl. No.: 14/867,314

(22) Filed: Sep. 28, 2015

(65) Prior Publication Data
US 2016/0090150 A1  Mar. 31, 2016

(30) Foreign Application Priority Data

Sep. 30, 2014 (JP) ................................. 2014-200934

(51) Int. Cl.
*B62L 3/02* (2006.01)
*B60T 11/16* (2006.01)
(Continued)

(52) U.S. Cl.
CPC .............. *B62L 3/023* (2013.01); *B60T 7/102* (2013.01); *B60T 11/165* (2013.01); *B60T 11/22* (2013.01)

(58) Field of Classification Search
CPC ........ B60T 7/102; B60T 11/162; B60T 11/16; B60T 11/22; B60T 11/232; B62L 3/023
See application file for complete search history.

(56) References Cited

U.S. PATENT DOCUMENTS 4,501,340 A * 2/1985 Yoshida ................. B62K 23/02
137/351
5,758,928 A * 6/1998 Kobayashi ................ B62L 1/00
188/346
(Continued)

FOREIGN PATENT DOCUMENTS

EP 2077214 8/1997
EP 2487082 8/2012
(Continued)

OTHER PUBLICATIONS

European Search Report for related EP application No. 15187349.4-1756 dated Mar. 21, 2016, 7 pages.
(Continued)

*Primary Examiner* — Richard Drake
(74) *Attorney, Agent, or Firm* — Andrew M. Calderon; Roberts Mlotkowski Safran Cole & Calderon, P.C.

(57) ABSTRACT

Cup seals are fitted to a cylinder hole of a hydraulic pressure master cylinder. A plunger is movably inserted into the cylinder hole via the cup seals. A fluid chamber is formed on an outer circumferential side of the cylinder hole and between the cup seals so as to communicate with a fluid storage chamber through a fluid communication hole. The plunger is formed in a cylindrical shape having a bottom and provided with a recess portion opening toward a bottom portion of the cylinder hole. A hydraulic pressure chamber is defined between the recess portion and the bottom portion. Plural communication ports are formed in a circumferential wall of the recess portion, to penetrate the circumferential wall. When the plunger is in an initial position and is in a non-operating state, the communication ports connect the hydraulic pressure chamber and the fluid chamber.

14 Claims, 2 Drawing Sheets

(51) Int. Cl.
*B60T 7/10* (2006.01)
*B60T 11/22* (2006.01)

(56) References Cited

U.S. PATENT DOCUMENTS

| | | | | |
|---|---|---|---|---|
| 6,739,133 B2* | 5/2004 | Barnett | ............... | B60T 7/08 |
| | | | | 60/594 |
| 7,100,751 B2* | 9/2006 | Lavezzi | ............... | B60T 11/16 |
| | | | | 188/24.14 |
| 7,997,075 B2* | 8/2011 | Drott | ............... | B60T 11/16 |
| | | | | 60/585 |
| 8,209,978 B2* | 7/2012 | Nen | ............... | B60T 11/232 |
| | | | | 60/588 |
| 8,904,782 B2* | 12/2014 | Gohr | ............... | B60T 11/16 |
| | | | | 60/588 |
| 9,475,473 B2* | 10/2016 | Charpentier | ............... | B60T 11/232 |
| 2005/0067891 A1 | 3/2005 | Ogiwara et al. | | |
| 2008/0216473 A1* | 9/2008 | Kim | ............... | B60T 11/236 |
| | | | | 60/588 |
| 2009/0071325 A1 | 3/2009 | Hanaoka et al. | | |
| 2009/0090105 A1* | 4/2009 | Taira | ............... | B60T 11/16 |
| | | | | 60/585 |
| 2010/0212313 A1 | 8/2010 | Aoki et al. | | |
| 2014/0053546 A1 | 2/2014 | Charpentier et al. | | |

FOREIGN PATENT DOCUMENTS

| | | |
|---|---|---|
| JP | 3542220 | 8/1997 |
| JP | 10273087 | 10/1998 |
| JP | 2000272572 | 10/2000 |
| JP | 2010064686 | 3/2010 |
| JP | 2012166586 | 9/2012 |
| JP | 2012197050 | 10/2012 |

OTHER PUBLICATIONS

Japanese Office Action Application No. 2014-200934 dated Apr. 18, 2017, 7 pages.

EP Office Action for Application No. 15187349.4 dated Feb. 13, 2018, 6 pages.

\* cited by examiner

HYDRAULIC PRESSURE MASTER CYLINDER FOR BAR-HANDLE VEHICLE

CROSS REFERENCE TO RELATED APPLICATION

This application is based on and claims priority under 35 U.S.C. § 119 to Japanese Patent Application No.2014-200934 (filed on Sep. 30, 2014), the entire contents of which are incorporated herein by reference.

BACKGROUND

Field

Exemplary embodiments of the invention relate to a hydraulic pressure master cylinder for a bar-handle vehicle, and particularly relates to a hydraulic pressure master cylinder suitable for use in a front wheel brake of a bar-handle vehicle and a hydraulic pressure control device.

Related Art

For example, Japanese Patent No. 3542220 describes a side port type hydraulic pressure master cylinder for use in a front wheel brake of a bar-handle vehicle. A pair of cup seals is fitted to a piston. The piston is movably inserted into a cylinder hole of the hydraulic pressure master cylinder so as to define a hydraulic pressure chamber between the piston and a cylinder hole bottom portion. A relief port and a supply port are formed in a cylinder body so as to communicate with the hydraulic pressure chamber and a reservoir. When a brake is operated, the master cylinder generates a hydraulic pressure in the hydraulic pressure chamber after the cup seal disposed on the cylinder-hole-bottom-portion side closes the relief port. Also, JP 2010-64686 A describes a center port type hydraulic pressure master cylinder. A cup seal is fitted to a piston. The piston is movably inserted into a cylinder hole so as to define a hydraulic pressure chamber between the piston and a cylinder hole bottom portion. A valve and a valve stem are provided so as to protrude from a distal end of the piston to the hydraulic pressure chamber. A fluid passage is formed in a cylinder body so as to communicate with the hydraulic hole and a reservoir. A through hole is formed in the piston so that the fluid passage and the hydraulic pressure chamber communicate with each other. When a brake is operated, the valve closes the through hole with forward movement of the piston to thereby generate a hydraulic pressure in the hydraulic pressure chamber.

SUMMARY

However, in the hydraulic pressure master cylinder described in Japanese Patent No. 3542220, when the brake is operated, the hydraulic pressure is generated as soon as the cup seal disposed on the cylinder-hole-bottom-portion side passes through the relief port. Thus, operational feeling is not good. Also, in a case where a hydraulic pressure control device such as an ABS device is connected to a fluid passage that connects the hydraulic pressure chamber of the hydraulic pressure master cylinder with the front wheel brake, since a diameter of the relief port is small, the performance to supply the hydraulic fluid to the hydraulic pressure control device is not good.

In the hydraulic pressure master cylinder described in JP 2010-64686 A, when the brake is operated, a hydraulic pressure increases in a state where the piston has moved forward so that the valve closes the fluid passage formed in the piston. Therefore, the operational feeling is good. Also, the performance to supply the hydraulic fluid to the hydraulic pressure control device is good. However, the number of components increases to increase cost. Furthermore, since the cylinder body becomes long, mountability on a vehicle body deteriorates.

In view of the above circumstances, some of exemplary embodiments of the invention provide a hydraulic pressure master cylinder for a bar-handle vehicle in which the number of components and a size of the master cylinder are reduced while it is possible to enhance the performance to supply a hydraulic fluid to a hydraulic pressure control device that is disposed in a fluid passage connecting a hydraulic pressure chamber of the hydraulic pressure master cylinder with a front wheel brake.

(1) According to one exemplary embodiment, a hydraulic pressure master cylinder for a bar-handle vehicle is provided for a front wheel brake and is operated by an operation lever for the front wheel brake. A pair of cup seals is fitted to a cylinder hole of the hydraulic pressure master cylinder. A plunger is movably inserted into the cylinder hole with the cup seals being interposed between the plunger and the cylinder hole. A fluid chamber is formed on an outer circumferential side of the cylinder hole and between the cup seals, so as to communicate with a fluid storage chamber of a reservoir through a fluid communication hole. The plunger is formed in a cylindrical shape having a bottom and provided with a recess portion that opens toward a bottom portion of the cylinder hole. A hydraulic pressure chamber is defined between the recess portion and the bottom portion of the cylinder hole. A plurality of communication ports are formed in a circumferential wall of the recess portion so as to penetrate the circumferential wall from inside to outside. When the plunger is in an initial position and is in a non-operating state, the communication ports connect the hydraulic pressure chamber and the fluid chamber. A hydraulic pressure control device is connected to a fluid passage that connects the front wheel brake and the hydraulic pressure master cylinder for the bar-handle vehicle.

(2) In the hydraulic pressure master cylinder of (1), an abutment portion may be formed in an outer end portion, on a cylinder-hole-opening-portion side, of the plunger so that a working arm of the operation lever abuts against the abutment portion.

With the hydraulic pressure master cylinder of (1) and (2), it is started to generate a hydraulic pressure in a state where the communication port formed in the plunger has passed through the cup seal on the cylinder-hole-bottom-portion side. Therefore, the hydraulic pressure can be prevented from suddenly increasing after the operation lever is operated, and the operating feeling can be kept good. Also, hydraulic fluid can be well supplied from the reservoir through the fluid communication hole, the fluid chamber, the plural communication ports and the hydraulic pressure chamber to the hydraulic pressure control device provided in the fluid passage, which connects the hydraulic pressure chamber and the front brake. Furthermore, the hydraulic pressure chamber is defined between the bottom portion of the cylinder hole and the recess portion provided in the plunger. Therefore, a length of a cylinder body in an axial direction can be reduced, and the mountability of the hydraulic pressure master cylinder on a vehicle body can be improved.

In addition, the abutment portion against which the working arm of the operation lever can abut is formed in the outer end portion of the plunger on the cylinder-hole-opening-portion side. Thus, the plunger can be well operated by the operation lever.

DETAILED DESCRIPTION

Figure 1:
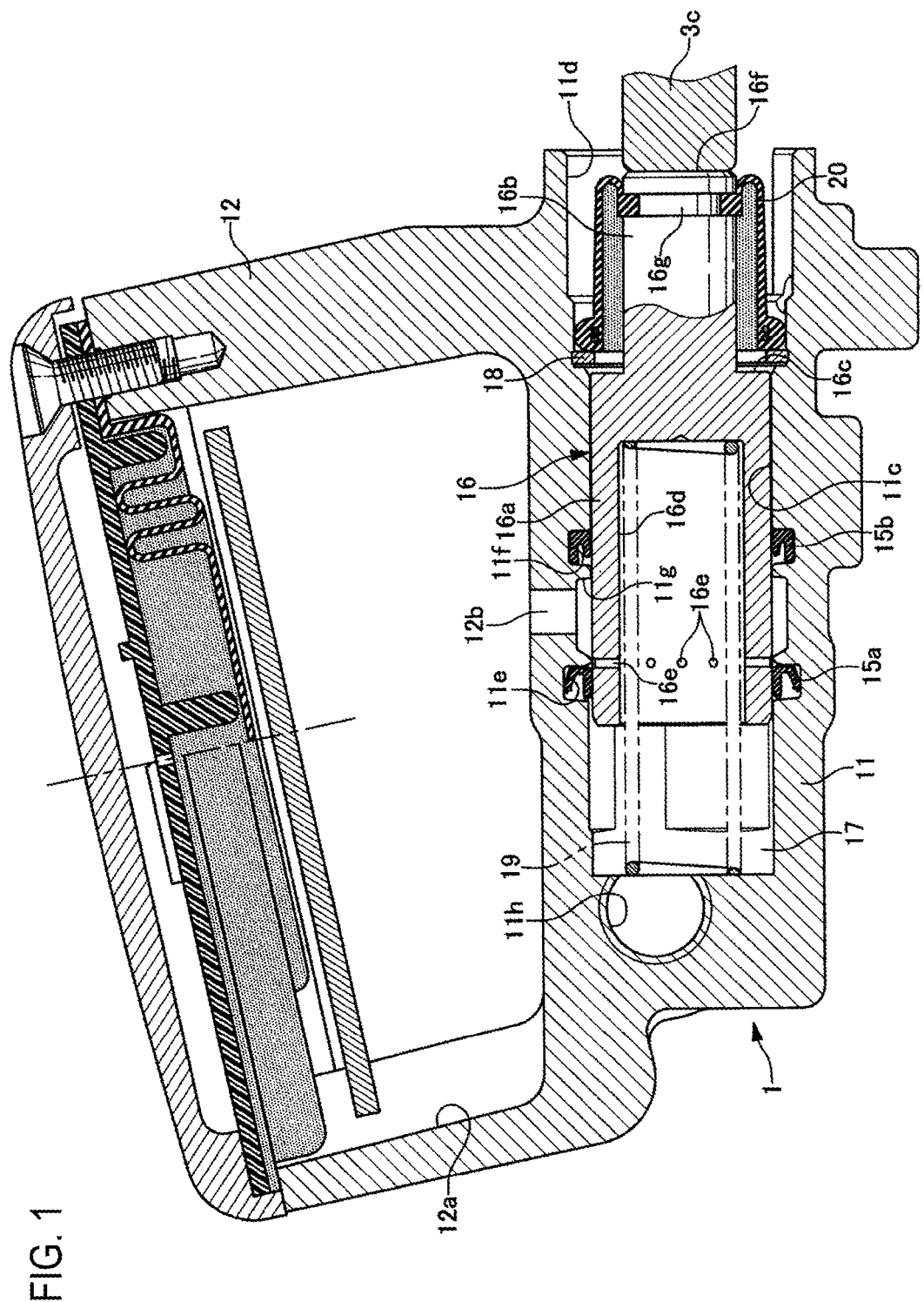
FIG. 1 is a section view taken along a line I-I in FIG. 2.
Figure 2:
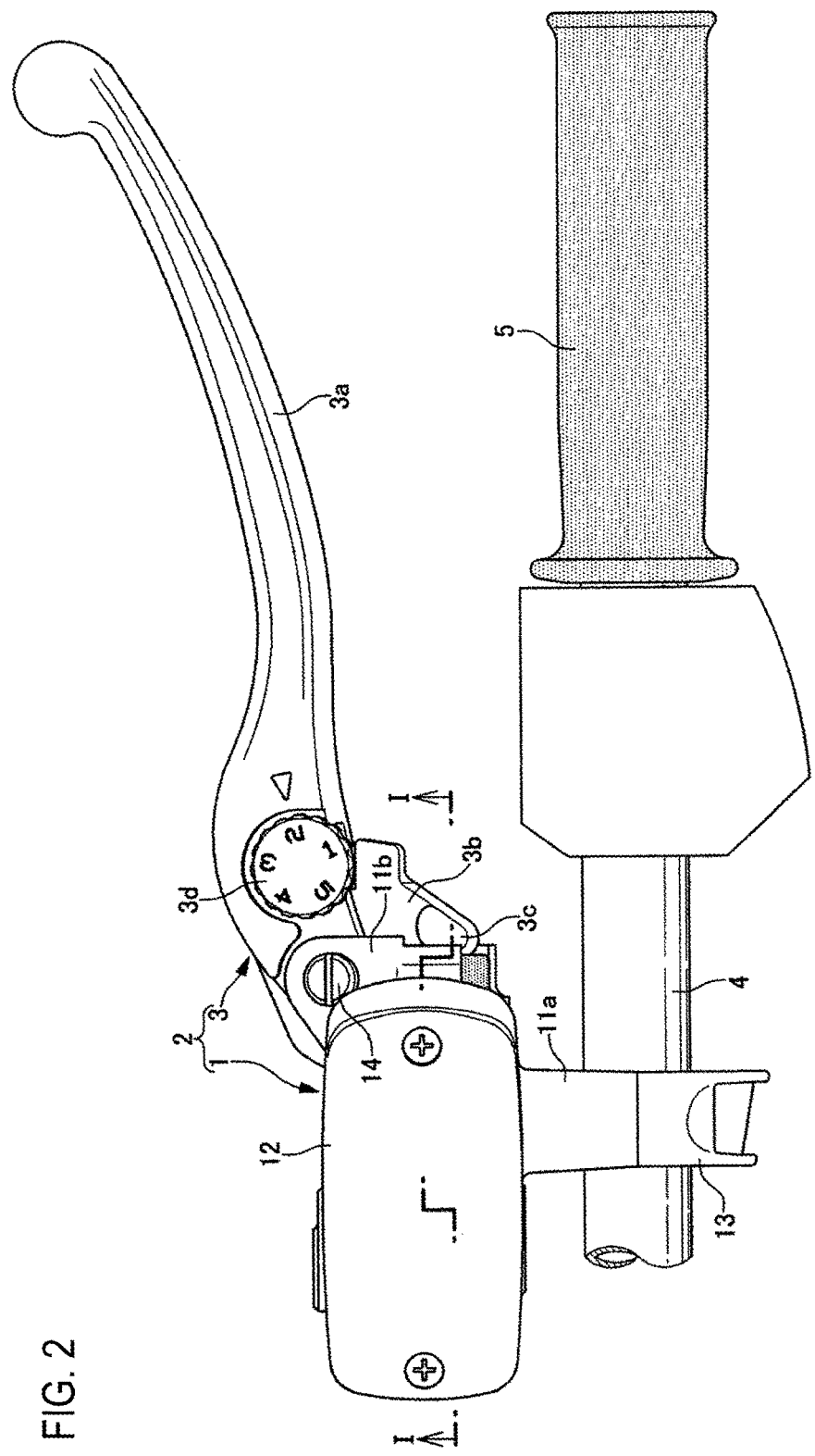
FIG. 2 is a plan view of a hydraulic pressure master cylinder device showing an exemplary embodiment of the invention.

FIGS. 1 and 2 show a hydraulic pressure master cylinder device 2 provided with a hydraulic pressure master cylinder 1 according to one exemplary embodiment of the invention. The hydraulic pressure master cylinder device 2 is a hydraulic pressure master cylinder device for a front brake, in which the hydraulic pressure master cylinder 1 and an operation lever 3 are combined. The hydraulic pressure master cylinder device 2 is attached to a handlebar 4. The handlebar 4 is disposed in a front portion of a vehicle body of a bar-handle vehicle and is used to steer a front wheel.

The hydraulic pressure master cylinder 1 is of a reservoir-integrated type in which a reservoir 12 is integrally provided on an upper portion of a cylinder body 11. A vehicle body mounting bracket 11a is integrated with the cylinder body 11. A holder 13 is provided as a separate component from the vehicle body mounting bracket 11a. The vehicle body mounting bracket 11a and the holder 13 embrace the handlebar 4, which is disposed on a vehicle-body inner side of an accelerator grip 5. The vehicle body mounting bracket 11a and the holder 13 are fastened by a bolt. With this configuration, the hydraulic pressure master cylinder 1 is supported on a vehicle-body-front-portion side. A plate-like lever bracket 11b is integrated with the vehicle front portion side of the cylinder body 11 so as to protrude from the cylinder body 11. The operation lever 3 is rotatably attached to the lever bracket 11b by a pivot 14.

A cylinder hole 11c is formed in the cylinder body 11. The cylinder hole 11c opens toward the operation lever 3. The cylinder hole 11c has a bottom. A large diameter hole 11d is formed on an opening side of the cylinder hole 11c so as to be continuations of the cylinder hole 11c. The cylinder hole 11c is formed with (i) a first seal groove 11e on the cylinder-hole-bottom-portion side and (ii) a second seal groove 11f on the cylinder-hole-opening-portion side. A first cup seal 15a is fitted into the first seal groove 11e. A second cup seal 15b is fitted into the second seal groove 11f. Also, a fluid chamber 11g is formed between the first seal groove 11e and the second seal groove 11f of the cylinder hole 11c. A fluid communication hole 12b communicates with the fluid chamber 11g. Operating fluid in a fluid storage chamber 12a of the reservoir 12 can flow through the fluid communication hole 12b. A plunger 16 is movably inserted into the cylinder hole 11c.

The plunger 16 has a large diameter portion 16a and a small diameter portion 16b. The large diameter portion 16a is inserted into the cylinder hole 11c. The small diameter portion 16b protrudes toward the large diameter hole 11d. A step portion 16c is formed between the large diameter portion 16a and the small diameter portion 16b. The step portion 16c abuts against a stop ring 18 attached to the large diameter hole 11d, so that a retreating limit of the plunger 16 is defined. A recess portion 16d in the large diameter portion 16a so as to open toward the bottom portion of the cylinder hole 11c is formed. A hydraulic pressure chamber 17 is defined between the recess portion 16d and the bottom portion of the cylinder hole 11c. A union hole 11h is formed in the bottom portion of the cylinder hole 11c so as to communicate with the hydraulic pressure chamber 17. A return spring 19 is provided between a bottom surface of the recess portion 16d and the bottom portion of the cylinder hole 11c. The return spring 19 urges the plunger 16 toward the opening portion of the cylinder hole 11c. Furthermore, a plurality of small diameter communication ports 16e are formed circumferentially in an opening-side circumferential wall of the recess portion 16d so as to penetrate the circumferential wall from inside to outside. When the plunger 16 is in a non-operating state and is at an initial position, the communication ports 16e communicates the hydraulic pressure chamber 17 with the fluid chamber 11g. Also, the small diameter portion 16b is provided with an abutment portion 16f at an outer end portion thereof. The abutment portion 16f abuts against a working arm of the operation lever 3. The small diameter portion 16b is circumferentially formed with a seal mounting groove 16g near the abutment portion 16f. A dust seal 20 is attached between the seal mounting groove 16g and the stop ring 18.

The operation lever 3 includes a lever body 3a and a knocker 3b. The lever body 3a is disposed on the vehicle-body front side of the accelerator grip 5. The knocker 3b is disposed between an inner side of the lever body 3a and the plunger 16. The knocker 3b is formed with the working arm 3c that pushes the plunger 16. Also, a grip margin adjustment mechanism 3d is provided between the lever body 3a and the knocker 3b. The grip margin adjustment mechanism 3d can adjust (expand/contract) a grip margin that is set between the lever body 3a and the accelerator grip 5.

When the thus-formed hydraulic pressure master cylinder 1 is not operated, as shown in FIG. 1, the communication ports 16e of the plunger 16 are retained, by a resilient force of the return spring 19, in their initial positions where the communication ports 16e are located on the cylinder-hole-opening-portion side of the first cup seal 15a. Thus, the hydraulic pressure chamber 17 communicates with the fluid chamber 11g through the communication ports 16e, so that hydraulic fluid can flow between the fluid storage chamber 12a of the reservoir 12 and the hydraulic pressure chamber 17.

When the working arm 3c of the knocker 3b of the operation lever 3 pushes the plunger 16 toward the bottom portion of the cylinder hole 11c during the operation of the hydraulic pressure master cylinder 1, the plunger 16 moves in the cylinder hole 11c toward the bottom portion of the cylinder hole 11c while compressing the return spring 19. When the communication ports 16e pass through the first cup seal 15a, the communication state between the hydraulic pressure chamber 17 and the fluid chamber 11a is blocked. At that time, it is started to generate a hydraulic pressure in the hydraulic pressure chamber 17. The operating fluid whose pressure has been increased is supplied from the union hole 11h to the front wheel brake through a fluid passage that is provided with the hydraulic pressure control device which executes the ABS control or the like.

When braking is released, the plunger 16 is restored to its initial position by the resilient force of the return spring 19. On this occasion, the hydraulic fluid flows into the hydraulic pressure chamber 17 through the first seal groove 11e from the fluid storage chamber 12a of the reservoir 12 while bending the first cup seal 15a. Thus, the plunger 16 can be retreated well.

The hydraulic pressure master cylinder 1 according to the exemplary embodiment is configured as described above. It is, therefore, possible to eliminate a valve and a valve stem, which have been provided in a distal end of a piston and used in a center port type hydraulic pressure master cylinder for a front wheel brake in the related art. Thus, the number of components can be reduced, and cost can also be reduced. Furthermore, the valve and the valve stem can be eliminated while the hydraulic pressure chamber 17 is defined between the bottom portion of the cylinder hole 11c and the recess portion 16d provided in the plunger 16. Therefore, a length of the cylinder body 11 in an axial direction can be reduced, and arrangement freedom of the hydraulic pressure master cylinder 1 on a vehicle body and mountability of the hydraulic pressure master cylinder 1 on the vehicle body can be improved. Furthermore, a hydraulic pressure is prevented from suddenly increasing after the operation lever 3 is operated. It is, therefore, possible to keep the operational feeling good. Also, hydraulic fluid can be well supplied from the fluid storage chamber 12a of the reservoir 12 through the fluid communication hole 12b, the fluid chamber 11g, the communication ports 16e and the hydraulic pressure chamber 17 to the hydraulic pressure control device provided in the fluid passage, which connects the hydraulic pressure chamber 17 with the front wheel brake. Furthermore, the abutment portion 16f is formed in the outer end portion of the plunger 16 on the cylinder-hole-opening-portion side. The working arm 3c provided in the knocker 3b of the operation lever 3 abuts against the abutment portion 16f. Thus, the plunger 16 can be well operated by the operation lever 3.

It is noted that the hydraulic pressure master cylinder according to the invention is not limited to one according to the exemplary embodiment described above in which (i) the operation lever is divided into the lever body and the knocker and (ii) the grip margin adjustment mechanism is provided. The operation lever may be formed by a single lever member provided with a working arm for pushing the plunger. Also, the invention is not limited to a hydraulic pressure master cylinder in which a reservoir is integrally provided. The invention may be also applied to a hydraulic pressure master cylinder in which a reservoir is provided as a separate component.

What is claimed is:

1. A hydraulic pressure master cylinder for a bar-handle vehicle, the hydraulic pressure master cylinder being provided for a front wheel brake and operated by an operation lever for the front wheel brake, wherein the hydraulic pressure master cylinder comprises:
    a pair of cup seals fitted to a wall of a cylinder hole of the hydraulic pressure master cylinder,
    a plunger movably inserted into the cylinder hole with the cup seals being interposed between the plunger and the cylinder hole,
    a fluid chamber formed in the wall of the cylinder hole on an outer circumferential side between the cup seals, so as to communicate with a fluid storage chamber of a reservoir through a fluid communication hole also formed in the wall,
    the plunger formed in a cylindrical shape having a bottom and provided with a recess portion that opens toward a bottom portion of the cylinder hole,
    a hydraulic pressure chamber defined between the recess portion and the bottom portion of the cylinder hole,
    a plurality of communication ports formed in a circumferential wall of the recess portion so as to penetrate the circumferential wall from inside to outside,
    when the plunger is in an initial position and is in a non-operating state, the communication ports connect the hydraulic pressure chamber and the fluid chamber, and
    wherein
    the hydraulic pressure master cylinder is a reservoir-integrated type in which the reservoir is integrally provided on an upper portion of a cylinder body, and
    a stop ring abuts and is directly attached to a stepped portion of the cylinder hole, and a dust seal abuts the stop ring, the dust seal is provided about an end portion of the plunger on the side opposite the stop ring, the stop ring is structured so that a retreating limit of the plunger is defined, and
    a stop ring is located between and directly attached to a stepped portion of the cylinder hole and a dust seal is provided about an end portion of the plunger, the stop ring is structured so that a retreating limit of the plunger is defined.

2. The hydraulic pressure master cylinder according to claim 1, wherein an abutment portion is formed in an outer end portion, on a cylinder-hole-opening-portion side, of the plunger so that a working arm of the operation lever abuts against the abutment portion.

3. The hydraulic pressure master cylinder according to claim 1, wherein
    the cylinder hole has a bottom,
    a large diameter hole is formed on an opening side of the cylinder hole so as to be continuous with the cylinder hole, which is smaller,
    the cylinder hole is formed with (i) a first seal groove on a cylinder-hole-bottom-portion side and (ii) a second seal groove on a cylinder-hole-opening-portion side,
    a first cup seal of the pair of cup seals is fitted into the first seal groove, and
    a second cup seal is fitted into the second seal groove.

4. The hydraulic pressure master cylinder according to claim 3, wherein the fluid chamber is formed between the first seal groove and the second seal groove of the cylinder hole.

5. The hydraulic pressure master cylinder according to claim 1, wherein
    a larger diameter portion of the piston is inserted into the cylinder hole,
    a smaller diameter portion of the piston protrudes toward a larger diameter hole of the cylinder hole,
    a step portion is formed between the larger diameter portion and the smaller diameter portion of the piston, and
    the step portion abuts against a stop ring attached to the larger diameter hole so that a retreating limit of the plunger is defined.

6. The hydraulic pressure master cylinder according to claim 1, wherein
    the recess portion is in the larger diameter portion of the piston so as to open toward the bottom portion of the cylinder hole,
    the hydraulic pressure chamber is defined between the recess portion and the bottom portion of the cylinder hole,
    union hole is formed in the bottom portion of the cylinder hole so as to communicate with the hydraulic pressure chamber,
    a return spring is provided between a bottom surface of the recess portion and the bottom portion of the cylinder hole, and the return spring urges the plunger toward an opening portion of the cylinder hole.

7. The hydraulic pressure master cylinder according to claim 6, wherein
the communication ports are formed circumferentially in an opening-side circumferential wall of the recess portion so as to penetrate the circumferential wall from inside to outside,
the smaller diameter portion of the piston is provided with an abutment portion at an outer end portion thereof,
the abutment portion abuts against a working arm of an operation lever, and
the small diameter portion is circumferentially formed with a seal mounting groove near the abutment portion.

8. The hydraulic pressure master cylinder according to claim 7, further comprising a dust seal attached between the seal mounting groove and the stop ring.

9. The hydraulic pressure master cylinder according to claim 4, wherein the communication ports are retained by a resilient force of a return spring in their initial position where the communication ports are located on the cylinder-hole-opening-portion side of the first cup seal.

10. The hydraulic pressure master cylinder according to claim 9, wherein when the communication ports pass through the first cup seal, the communication state between the hydraulic pressure chamber and the fluid chamber is blocked and a hydraulic pressure is generated in the hydraulic pressure chamber.

11. The hydraulic pressure master cylinder according to claim 10, wherein
when braking is released, the plunger is restored to its initial position by the resilient force of the return spring and the hydraulic fluid flows into the hydraulic pressure chamber through the first seal groove from the fluid storage chamber of the reservoir while bending the first cup seal.

12. The hydraulic pressure master cylinder according to claim 2, further comprising:
a plate-like lever bracket integrated with a vehicle front portion side of the cylinder body so as to protrude from the cylinder body,
an operation lever rotatably attached to the lever bracket by a pivot, and
the cylinder hole opens toward the operation lever.

13. The hydraulic pressure master cylinder according to claim 12, wherein
a smaller diameter portion of the piston is provided with the abutment portion at an outer end portion thereof,
the smaller diameter portion is circumferentially formed with a seal mounting groove near the abutment portion.

14. The hydraulic pressure master cylinder according to claim 13, wherein
the operation lever includes a lever body and a knocker,
the lever body is disposed on a vehicle-body front side of the accelerator grip,
the knocker is disposed between an inner side of the lever body and the plunger, and
the knocker is formed with the working arm that pushes the plunger.

* * * * *